April 14, 1931. C. N. HICKMAN 1,800,796

VALVE UNIT

Filed June 4, 1927

INVENTOR.
Clarence N. Hickman
BY
Emery, Booth, Janney & Varney
ATTORNEYS.

Patented Apr. 14, 1931

1,800,796

UNITED STATES PATENT OFFICE

CLARENCE N. HICKMAN, OF JACKSON HEIGHTS, NEW YORK, ASSIGNOR, BY MESNE ASSIGNMENTS, TO AMERICAN PIANO CORPORATION, OF EAST ROCHESTER, NEW YORK, A CORPORATION OF DELAWARE

VALVE UNIT

Application filed June 4, 1927. Serial No. 196,414.

This invention relates to valve units for automatic pneumatic musical instruments.

It is an object of this invention to provide a valve unit of general utility which shall operate rapidly and surely and which shall be capable of operation over extended periods of time without removal for cleaning.

It is a further object of this invention to provide a valve unit particularly adapted for use in the stack of automatic pianos which shall have sufficient capacity and at the same time sufficient rapidity of action to permit its use as a single valve unit in place of the primary and secondary units frequently employed.

Heretofore it has been attempted to improve the action of valve units by utilizing a bleed opening of unusual size between the exhaust and diaphragm chambers. It was found that with a small size opening the speed of the valve was increased on the up stroke, but on the down stroke the speed was decreased due to the increased time necessary to exhaust the diaphragm chamber through the small bleed. On the other hand, with a large bleed opening the valve was sluggish and uncertain at low pressures in its upward movement, although the downward speed was increased.

According to the present invention it is proposed to provide a relatively small effective bleed opening during the major portion of the upward travel of the valve, and to provide a second bleed opening which is effective during the major portion of the downward travel of the valve, whereby the action of the valve is relatively rapid and certain in both directions.

A preferred embodiment of the invention selected for purposes of illustration is shown in the accompanying drawings, in which, Figure 1 is a top plan view.

Figure 1:
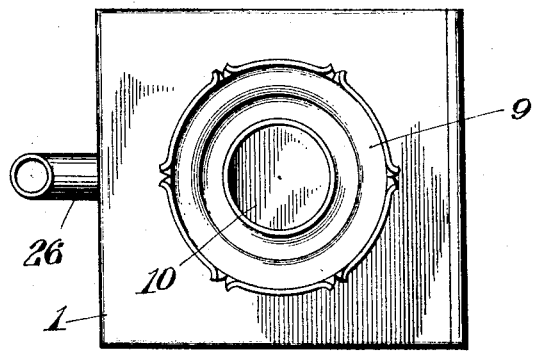
Figure 2:
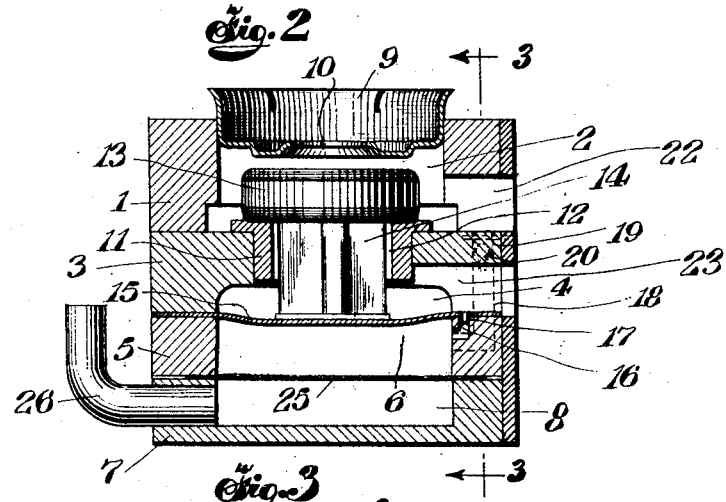
Figure 2 is a section on the line 2—2 of Figure 3.
Figure 3:
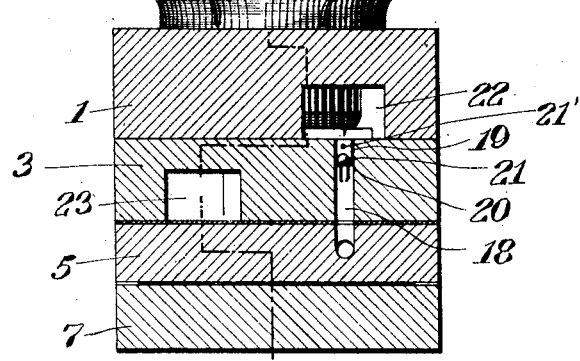
Figure 3 is a section on the line 3—3 of Figure 2.

Referring to the drawings, the illustrative valve unit comprises a block 1 having a valve chamber 2 therein, a block 3 having an exhaust chamber 4 therein, a block 5 having a diaphragm chamber 6 therein, and a block 7 having a dust collecting chamber 8 therein. The blocks comprising the unit may be secured together in any suitable manner.

The valve chamber 2 is provided with a valve seat 9 having an aperture 10 to atmosphere, and a valve seat 11 having an aperture 12 to the exhaust chamber. The valve 13 is normally seated on the seat 11, and is provided with a valve stem 14 which extends through the aperture 12 to engage the diaphragm 15.

A bleed duct 16 is provided having a bleed cup 17 therein, providing a relatively small bleed passage connecting the exhaust and diaphragm chambers. The size of this bleed may be such that it will pass a minimum of air and merely hold the diaphragm in depressed position by overcoming the normal seepage of air to the diaphragm chamber. Means are provided to effect a larger opening from the diaphragm chamber to exhaust when needed, such means herein taking the form of a duct 18 connecting the diaphragm and valve chambers, and having a bleed cup 19 therein providing a relatively large bleed passage. Resting in the cup 19 and seating on the shoulder 20 is a ball valve 21 preferably of metal, the purpose of which will be explained hereinafter. The ball valve is suitably held within the cup as by means of the pin 21'.

The valve chamber 2 is provided with a port 22 which may be connected to a pneumatic or other device to be controlled, and the exhaust chamber 4 is provided with a port 23 for connection with a source of exhaust. The diaphragm chamber 6 and dust collecting chamber 8 are separated by a suitable dust screen such as a fabric disk 25 for a purpose hereinafter described. The chamber 8 may be connected to a tracker bar through the duct 26 in the usual manner.

Assuming that the valve is in the position illustrated, and assuming that the unit is connected to a pneumatic and to a source of exhaust through ports 22 and 23 respectively, the valve chamber 2 is open to atmosphere, chamber 4 is subjected to exhaust, and chambers 6 and 8 and duct 26 are subjected to exhaust from chamber 4 through bleed 17, assuming that the tracker vent is closed. Ball valve 21 remains seated due to its weight and to the differential of pressure existing between atmosphere in chamber 2 and exhaust in chamber 6. If, under these conditions, atmosphere is admitted through duct 26, the differential of pressure created between chambers 4 and 6 causes the diaphragm 15 to rise to lift the valve 13 from seat 11 toward seat 9, and the speed of the valve will be relatively fast because atmosphere is being admitted to the diaphragm chamber through duct 26 much more rapidly than it can be exhausted through bleed 17. At the same time, ball valve 21 remains seated due to its own weight and to the slight exhaust maintained in chamber 6 by the bleed 17. As soon as a sufficient condition of exhaust is created in chamber 2, however, the pressure beneath the ball valve 21 causes it to be lifted and air is withdrawn from chambers 6 and 8 through bleed passage 18, this condition continuing so long as the valve 13 remains against seat 9 and so long as chamber 2 is subjected to exhaust.

If, under these conditions, the influx of atmosphere through the duct 26 is cut off, the air in chambers 6 and 8 will be rapidly exhausted at first through the two bleeds 17 and 19 and the valve 13 will start to descend, thus admitting atmosphere to the valve chamber 2 through the port 10. As soon as the atmosphere thus admitted creates a pressure in the chamber 2 greater than that existing in the chamber 6 from which air is being exhausted, ball valve 21 will seat itself, thus preventing additional bleeding through the cup 19.

Thus it will be observed that during the up stroke of the valve only the small bleed 17 is effective and, therefore, the valve moves upwardly very rapidly. On the other hand, during the down stroke of the valve both of the bleed openings are cooperating to exhaust chambers 6 and 8 and, therefore, the downward motion of the valve is also very rapid.

The strip of fabric 25 between the chambers 6 and 8 serves as a strainer or filter to prevent dust entering through the duct 26 from penetrating to the chamber 6 to clog the openings of the bleed cups. It will be observed that the area of the strip is substantially equal to the cross sectional area of the chambers and that a very large area is presented for the passage of air. Thus, even though considerable dust may be have accumulated in the chamber 8, air is permitted to pass freely to chamber 6 at all times. Due to this provision the valve unit is capable of operation for extended periods without cleaning.

It will be understood that the invention may be variously modified and embodied within the scope of the subjoined claims.

I claim as my invention:

1. In a pneumatic valve action having a diaphragm chamber, exhaust chamber, and valve chamber, in combination, means providing a bleed duct connecting said diaphragm and exhaust chambers, and means providing a second duct connecting said diaphragm and valve chambers, and a valve controlling communication through said second duct.

2. In a pneumatic valve action having a diaphragm chamber, exhaust chamber, and valve chamber, in combination, means providing a bleed duct connecting said diaphragm and exhaust chambers, and means providing a second duct connecting said diaphragm and valve chambers, means forming a valve seat in said second duct, and a ball adapted to cooperate with said seat to control communication through said duct.

3. In a pneumatic valve action having a diaphragm chamber, exhaust chamber, and valve chamber, in combination, means providing a bleed duct connecting said diaphragm and exhaust chambers, and means providing a second duct connecting said diaphragm and valve chambers, and a check valve to prevent passage of air from said valve chamber to said diaphragm chamber through said duct.

4. In a pneumatic valve action having a diaphragm chamber, exhaust chamber, and valve chamber, in combination, means affording constricted communication at all times between said diaphragm and exhaust chambers, and means affording communication between said diaphragm and valve chambers whenever a greater degree of exhaust exists in said valve chamber than exists in said diaphragm chamber, but preventing communication whenever said conditions are reversed.

5. In a pneumatic valve action having three chambers, means providing a bleed duct connecting one pair of said chambers, and means providing a second bleed duct connecting a different pair of said chambers, and a check valve in one of said ducts for controlling the passage of air therethrough.

6. In a pneumatic valve action, a diaphragm chamber, exhaust chamber, and valve chamber, and means permitting flow of air from said diaphragm chamber to said valve chamber but preventing flow of air in the opposite direction.

7. In a pneumatic valve action, a diaphragm chamber, exhaust chamber, valve chamber, and a valve controlled passage from said diaphragm chamber to said valve chamber permitting flow of air in one direction only.

In testimony whereof, I have signed my name to this specification.

CLARENCE N. HICKMAN.